United States Patent
Samuel et al.

(10) Patent No.: US 10,691,448 B2
(45) Date of Patent: Jun. 23, 2020

(54) METHOD AND APPARATUS TO EXECUTE BIOS FIRMWARE BEFORE COMMITTING TO FLASH MEMORY

(71) Applicant: DELL PRODUCTS, LP, Round Rock, TX (US)

(72) Inventors: Balasingh Ponraj Samuel, Round Rock, TX (US); Anand P. Joshi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/999,188

(22) Filed: Aug. 18, 2018

(65) Prior Publication Data
US 2020/0057629 A1    Feb. 20, 2020

(51) Int. Cl.
| | | |
|---|---|---|
| G06F 9/44 | (2018.01) |
| G06F 9/24 | (2006.01) |
| G06F 9/445 | (2018.01) |
| G06F 11/14 | (2006.01) |
| G06F 21/57 | (2013.01) |
| G06F 8/654 | (2018.01) |
| G06F 11/27 | (2006.01) |
| G06F 11/36 | (2006.01) |
| G06F 8/61 | (2018.01) |
| G06F 8/656 | (2018.01) |
| G06F 9/451 | (2018.01) |

(Continued)

(52) U.S. Cl.
CPC ............. *G06F 8/654* (2018.02); *G06F 11/27* (2013.01); *G06F 21/575* (2013.01); *G06F 8/64* (2013.01); *G06F 8/65* (2013.01); *G06F 8/656* (2018.02); *G06F 9/4401* (2013.01); *G06F 9/453* (2018.02); *G06F 11/1417* (2013.01); *G06F 11/3664* (2013.01)

(58) Field of Classification Search
CPC ........ G06F 11/1417; G06F 8/654; G06F 8/65; G06F 8/64; G06F 8/656; G06F 8/71; G06F 21/572; G06F 21/575; G06F 9/4401; G06F 9/453; G06F 9/44505; G06F 9/4403; G06F 11/3664
See application file for complete search history.

(56) References Cited

U.S. PATENT DOCUMENTS

| | | | | |
|---|---|---|---|---|
| 6,438,688 B1 * | 8/2002 | Nunn | ........................ | G06F 8/65 709/220 |
| 7,225,327 B1 * | 5/2007 | Rasmussen | ........... | G06F 9/4401 713/1 |

(Continued)

OTHER PUBLICATIONS

David Cooper et al., Recommendations of the National Institute of Standards and Technology, Apr. 2011, [Retrieved on Feb. 18, 2020]. Retrieved from the internet: <URL: https://csrc.nist.rip/library/NIST%20SP%20800-147%20BIOS%20Protection%20Guidelines,%202011-04-29%20(Final).pdf> 26 Pages (1-26) (Year: 2011).*

(Continued)

*Primary Examiner* — Anibal Rivera
(74) *Attorney, Agent, or Firm* — Larson Newman, LLP

(57) ABSTRACT

A method includes receiving a basic input/output system (BIOS) update executable at an information handling system. The executable includes a BIOS image that is stored at system memory included at the information handling system. A boot sequence is initiated at the information handling system using the BIOS image stored at the system memory.

17 Claims, 5 Drawing Sheets

(51) Int. Cl.
*G06F 9/4401* (2018.01)
*G06F 8/65* (2018.01)

(56) References Cited

U.S. PATENT DOCUMENTS

| | | | |
|---|---|---|---|
| 7,340,638 B2 | 3/2008 | Nicholson et al. | |
| 7,487,345 B2* | 2/2009 | Khatri | G06F 8/64 |
| | | | 713/100 |
| 7,500,095 B2* | 3/2009 | Mahmoud | G06F 8/654 |
| | | | 713/2 |
| 7,574,593 B2* | 8/2009 | Mayfield | G06F 9/4403 |
| | | | 713/1 |
| 7,849,454 B2 | 12/2010 | Lambert et al. | |
| 7,908,469 B2* | 3/2011 | Yu | G06F 9/4401 |
| | | | 713/1 |
| 8,132,055 B2 | 3/2012 | Andreson et al. | |
| 8,898,797 B2* | 11/2014 | Konetski | G06F 21/572 |
| | | | 709/225 |
| 9,146,726 B2* | 9/2015 | Jibbe | G06F 8/71 |
| 9,268,667 B2* | 2/2016 | Chen | G06F 9/4406 |
| 9,846,617 B2* | 12/2017 | Rahardjo | G06F 11/1417 |
| 2004/0003265 A1* | 1/2004 | Freeman | G06F 12/1466 |
| | | | 713/191 |
| 2005/0081024 A1* | 4/2005 | Khatri | G06F 8/64 |
| | | | 713/100 |
| 2005/0138266 A1* | 6/2005 | Brannock | G06F 8/60 |
| | | | 711/100 |
| 2006/0123223 A1* | 6/2006 | Mayfield | G06F 9/4403 |
| | | | 713/2 |
| 2006/0155977 A1* | 7/2006 | Padilla | G06F 9/4401 |
| | | | 713/1 |
| 2006/0259518 A1 | 11/2006 | Lomet et al. | |
| 2007/0186086 A1* | 8/2007 | Lambert | G06F 8/65 |
| | | | 713/1 |
| 2007/0220244 A1* | 9/2007 | Mahmoud | G06F 8/654 |
| | | | 713/2 |
| 2008/0072029 A1* | 3/2008 | Yu | G06F 9/4401 |
| | | | 713/1 |
| 2009/0132799 A1* | 5/2009 | Brumley | G06F 9/44505 |
| | | | 713/100 |
| 2009/0292910 A1* | 11/2009 | Yang | G06F 9/453 |
| | | | 713/2 |
| 2009/0307476 A1* | 12/2009 | Khatri | G06F 9/4401 |
| | | | 713/2 |
| 2010/0070619 A1* | 3/2010 | Chaganti | G06F 8/656 |
| | | | 709/222 |
| 2010/0235833 A1* | 9/2010 | Huang | G06F 21/575 |
| | | | 718/1 |
| 2012/0159142 A1* | 6/2012 | Jibbe | G06F 8/65 |
| | | | 713/100 |
| 2012/0159238 A1* | 6/2012 | Wang | G06F 11/1417 |
| | | | 714/6.1 |
| 2013/0031538 A1* | 1/2013 | Skalsky | G06F 8/654 |
| | | | 717/168 |
| 2013/0031541 A1* | 1/2013 | Wilks | G06F 8/654 |
| | | | 717/176 |
| 2013/0125107 A1* | 5/2013 | Bandakka | G06F 11/1417 |
| | | | 717/171 |
| 2013/0276128 A1* | 10/2013 | Konetski | G06F 21/572 |
| | | | 726/26 |
| 2014/0149730 A1* | 5/2014 | Joshi | G06F 21/572 |
| | | | 713/2 |
| 2014/0173171 A1* | 6/2014 | Chen | G06F 11/3664 |
| | | | 711/102 |
| 2014/0351571 A1* | 11/2014 | Jacobs | G06F 21/575 |
| | | | 713/2 |
| 2016/0162689 A1* | 6/2016 | Martinez | G06F 9/4401 |
| | | | 726/1 |
| 2016/0180094 A1* | 6/2016 | Dasar | G06F 21/575 |
| | | | 714/36 |
| 2016/0232356 A1* | 8/2016 | Barkelew | G06F 21/572 |
| 2016/0328300 A1* | 11/2016 | Rahardjo | G06F 11/1417 |
| 2016/0342477 A1* | 11/2016 | Swierk | G06F 21/566 |
| 2017/0085383 A1* | 3/2017 | Rao | G06F 3/0632 |
| 2017/0147329 A1* | 5/2017 | Shutt | G06F 8/654 |
| 2017/0155573 A1* | 6/2017 | Khemani | H04L 41/0663 |
| 2018/0293061 A1* | 10/2018 | Arms | G06F 8/654 |

OTHER PUBLICATIONS

Andrew Regenscheid et al., BIOS Protection Guidelines for Servers, Aug. 2014, [Retrieved on Feb. 18, 2020]. Retrieved from the internet: <URL: http://citeseerx.ist.psu.edu/viewdoc/download?doi=10.1.1.692.4596&rep=rep1&type=pdf> 32 Pages (1-32) (Year: 2014).*

* cited by examiner

METHOD AND APPARATUS TO EXECUTE
BIOS FIRMWARE BEFORE COMMITTING
TO FLASH MEMORY

FIELD OF THE DISCLOSURE

This disclosure generally relates to information handling systems, and more particularly relates to executing BIOS firmware before committing the firmware to flash memory.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. The software resources include device drivers and firmware that control operation and interoperability of system components.

SUMMARY

A method includes receiving a basic input/output system (BIOS) update executable at an information handling system. The executable includes a BIOS image that is stored at a hard drive and at system memory included at the information handling system. A boot sequence is initiated at the information handling system using the BIOS image stored at the system memory.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
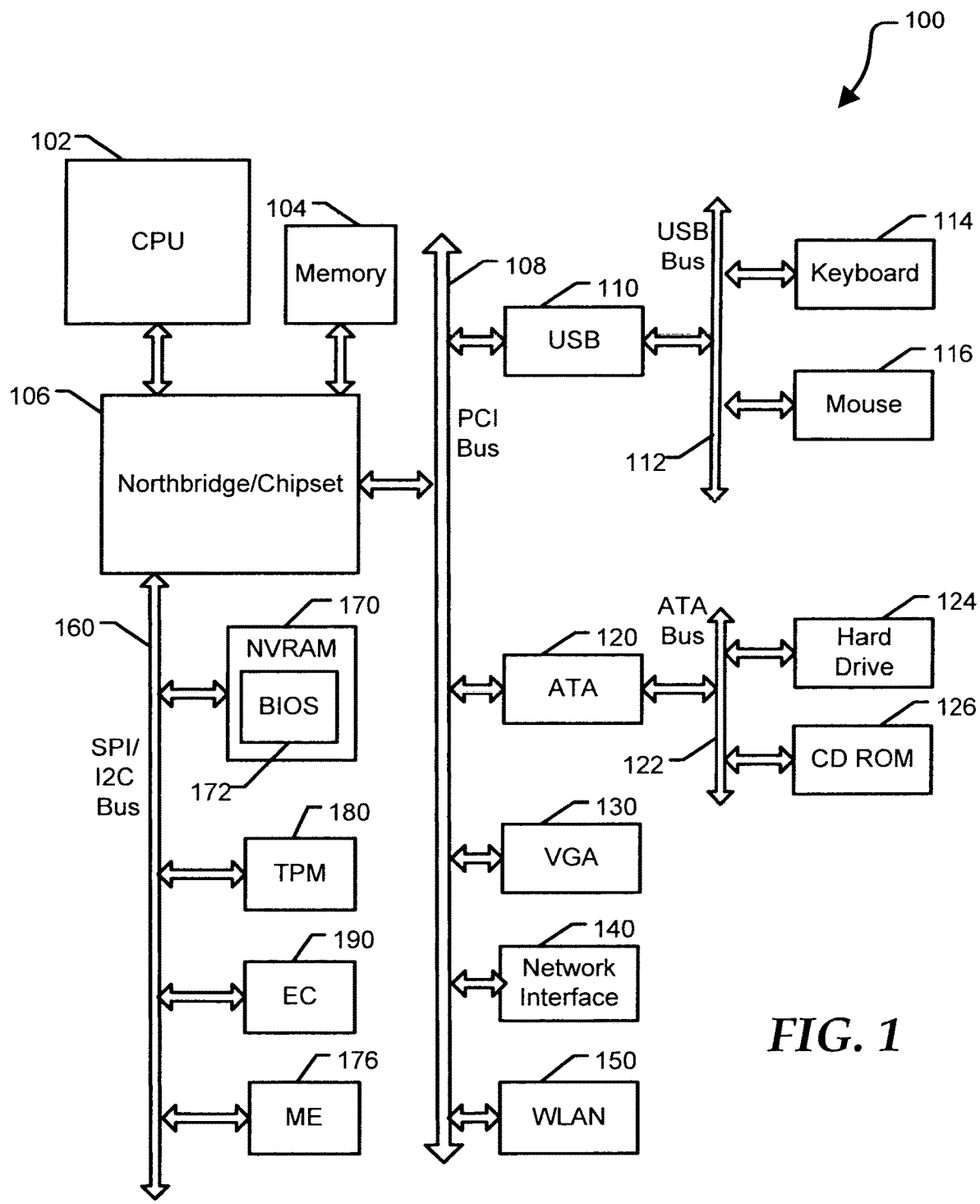
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

An information handling system typically includes a basic input/output system (BIOS) that is responsible for initializing hardware components during a startup process of the system. The BIOS includes instructions executable by a central processing unit (CPU) to initialize and test the hardware components that make up the information handling system, and to load a boot loader or an operating system (OS) from a mass storage device. The BIOS additionally provides an abstraction layer for the hardware, that is, a consistent way for application programs and the OS to interact with the keyboard, display, and other input/output devices. When power is first applied to an information handling system, the system begins a sequence of initialization procedures. During the initialization sequence, also referred to as a boot sequence, components of the system are configured and enabled for operation, and device drivers can be installed. Device drivers provide an interface through which other components of the system can communicate with a corresponding device.

The BIOS is typically stored at a non-volatile memory device, such as a non-volatile random access memory (NVRAM), known as flash device. An information handling system is typically delivered to a customer with an initial version of the BIOS already installed at the NVRAM. During the lifetime of an information handling system, it may become necessary or advisable to update the BIOS with a new version having one or more revisions. This procedure is often referred to as flashing the BIOS. During this process, the previous BIOS can be deleted, and the revised BIOS is stored at the NVRAM. Sometimes the BIOS update leads to unintended consequences, such as a fail to boot, or other device operation failures. For example, the information handling system may have received new hardware devices or other configuration changes that are not compatible with the updated BIOS. Committing inappropriate BIOS firmware to the NVRAM can render the information handling system partially or completely inoperable, requiring intervention by the original equipment manufacturer or another repair service. For example, replacement of the system's primary circuit board may be necessary to recover operation. Techniques disclosed herein can be used to test a prospective new BIOS image before storing the image at the NVRAM. In particular, the updated BIOS can be stored at a volatile memory device included at the information handling system, and this copy of the BIOS can be used to boot the system. If the test of the new BIOS image is successful, the new image can be committed to the BIOS NVRAM.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a trusted platform module (TPM) 180, and an embedded controller (EC) 190. EC 190 is responsible for performing low level hardware tasks including thermal management and power management operations. NVRAM 170 can be referred to as a SPI flash storage device, BIOS SPI, and the like. System 100 can further include a management engine (ME) 176. Like EC 190, ME 176 can operate independently of primary CPU core processors, and is responsible for performing the earliest stages of initialization of system 100. ME 176 may be configured to authenticate the first block of BIOS code stored at NVRAM 170 before releasing the x86 processor from reset. Accordingly, ME 176 provides a hardware root of trust for system 100.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS or BIOS image is herein used interchangeably with the term firmware image. In an embodiment, BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
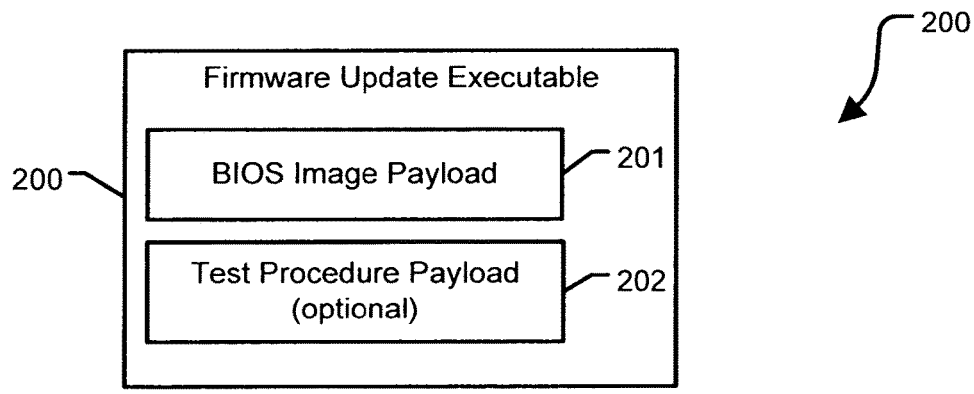
FIG. 2 is a block diagram illustrating a firmware update executable according to a specific embodiment of the present disclosure.

FIG. 2 shows a firmware update executable 200 according to a specific embodiment of the present disclosure. Executable 200 includes a BIOS image payload 201, and may further include a test procedure payload 202. Firmware update executable 200 is a program executable by an operating system, for example Windows, Linux, and the like. Traditionally, such an update executable would initiate a sequence of steps that culminates with replacing the current BIOS image 172 stored at NVRAM 170 with the updated imaged included at payload 201. As disclosed herein, the BIOS image at payload 201 is first stored at system memory, for example memory 104, from where it can be executed and its functionality evaluated. If information handling system 100 successfully boots using the new BIOS, the current BIOS can be deleted and the new BIOS can be stored at NVARM 170. At used herein, the operation of storing the new BIOS at NVRAM 170 can be referred to as flashing or committing. In an embodiment, the test procedure included at payload 202 can be stored at memory 104 and executed during the boot sequence to verify or further validate the suitability of the updated BIOS firmware.

Figure 3:
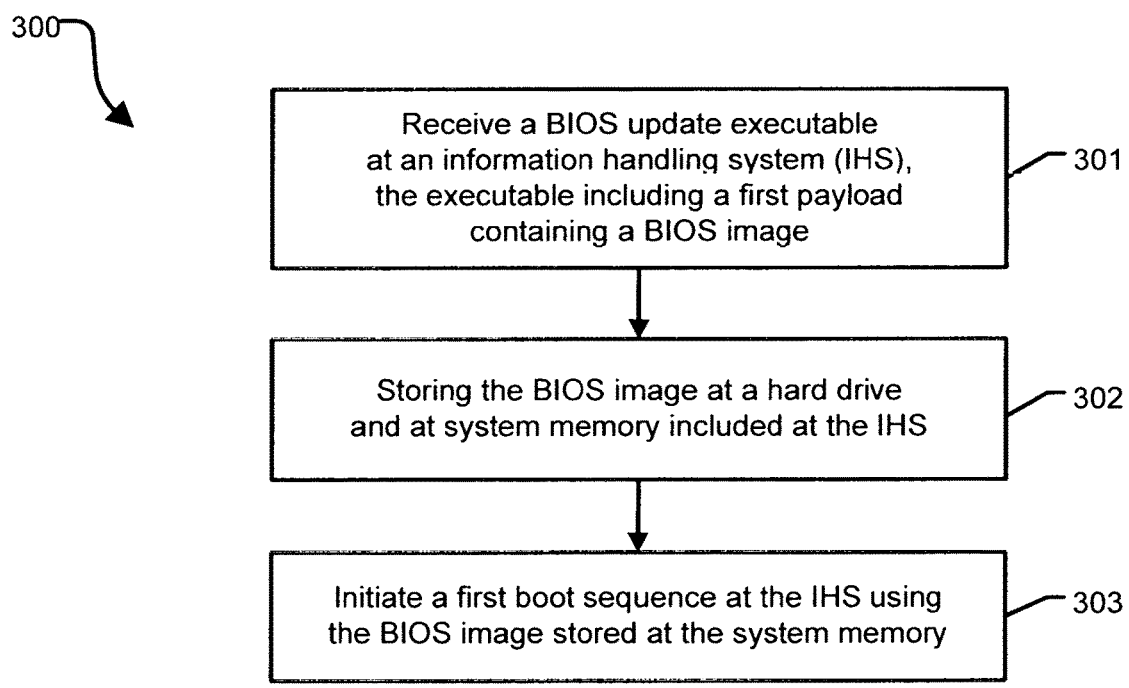
FIG. 3 is a flow diagram illustrating a method for testing new BIOS firmware before committing the firmware to a primary BIOS flash memory device according to a specific embodiment of the present disclosure.

FIG. 3 shows a method 300 for testing new BIOS firmware before committing the firmware to a primary BIOS flash memory device according to a specific embodiment of the present disclosure. Method 300 begins at block 301 where a BIOS update executable is received at an information handling system, the executable including a payload containing a BIOS image. For example, a user of information handling system may download firmware update executable 200 from a service provider, such as the original equipment manufacture of system 100. Once update executable 200 has been downloaded, the user may run executable 200 like any other runtime program. In other cases, OS update fighting services such as WU (Windows Update) may deliver new BIOS Image Payload 201 and optional Test Procedure Payload 202. Method 300 continues at block 302 where the BIOS image included at the payload is stored at a hard drive or another BIOS-accessible storage resource included at the information handling system. The BIOS image is also reassembled and stored at a system memory device, such as system memory 104. As used herein, the term hard drive may refer to a traditional disk drive having rotating magnetic storage media or to other mass storage devices, for example a solid state drive. At block 303, a new system startup and initialization sequence is initiated using the BIOS image stored at the system memory. As described below, firmware update executable 200 may configure a boot mode variable to indicate that the next boot of information handling system 100 should use the updated BIOS image stored at system memory 104 rather than BIOS image 172 stored at NVRAM 170.

Figure 4:
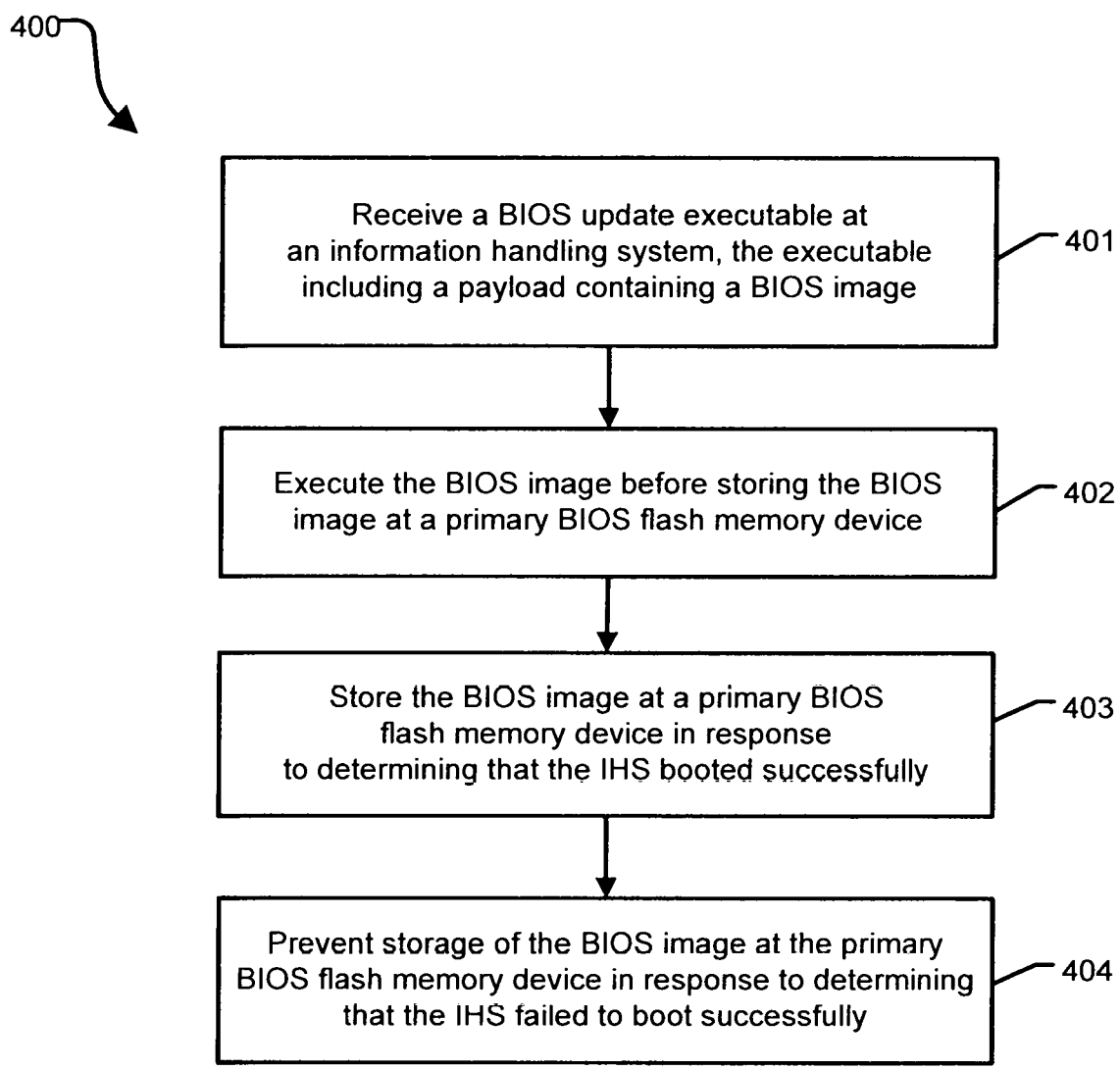
FIG. 4 is a flow diagram illustrating a method for selectively updating a primary BIOS flash memory device based on determining whether an information handling system successfully booted using an updated firmware image stored at system memory, according to a specific embodiment of the present disclosure.

FIG. 4 shows a method 400 for selectively updating a primary BIOS flash memory device based on determining whether an information handling system successfully booted using an updated firmware image stored at system memory, according to a specific embodiment of the present disclosure. Method 400 begins at block 401 where a BIOS update executable is received at an information handling system, the executable including a payload containing a BIOS image. In an embodiment, the updated BIOS image included at payload 201, and optionally the test procedure included at payload 202, may be encrypted and/or compressed, and the image or test procedure may need to be decoded or decompressed prior to storing. One or more of payloads 201 and 202 may further be authenticated using an encryption key or certificate protocol. The BIOS image at payload 201 can be copied to system memory 104 and identified as a firmware volume. The image can be stored at a hard drive where it can be retrieved later to be committed to NVRAM 170 if the image is found to be acceptable.

At block 402, the BIOS image included at the payload is executed before storing the image at a primary BIOS flash memory device. For example, the updated BIOS image can be stored at system memory 104 and information handling system 100 can be configured to boot using this updated BIOS image instead of the previous image stored at NVRAM 170. Method 400 continues at block 403 where the BIOS image is stored at a primary BIOS flash memory device in response to determining that the information handling system boot successfully using the updated image. Method 400 completes at block 404 where if it is determined that the information handling system failed to boot successfully using the updated BIOS image, the updated BIOS image is not stored at the primary BIOS flash memory device.

As disclosed herein, there can be multiple criteria utilized to evaluate whether the information handling system booted successfully using the updated BIOS image. The decision to commit the updated BIOS to NVRAM 170 can be based on one or more of these criteria. In an embodiment, the updated BIOS, when executed, can determine that a UEFI ExitBootService( ) function registered by an operating system loader is successfully called. In another embodiment, the test procedure included at payload 202 can be executed during the boot sequence, and a favorable conclusion of the test procedure can be taken into consideration to determine whether to commit the updated BIOS to NVRAM 170. In yet another embodiment, a prompt can be provided to a user of the information handling system, the prompt requesting permission from the user as to whether to commit the new BIOS. In still another embodiment, the declaration to commit the updated BIOS to NVRAM can require execution of a runtime program by a user of information handling system 100. Accordingly, the decision to commit the new BIOS can be automated based on successful completion of one or more diagnostic or test procedures, or the decision can require intervention by a user of information handling system 100.

Figure 5:
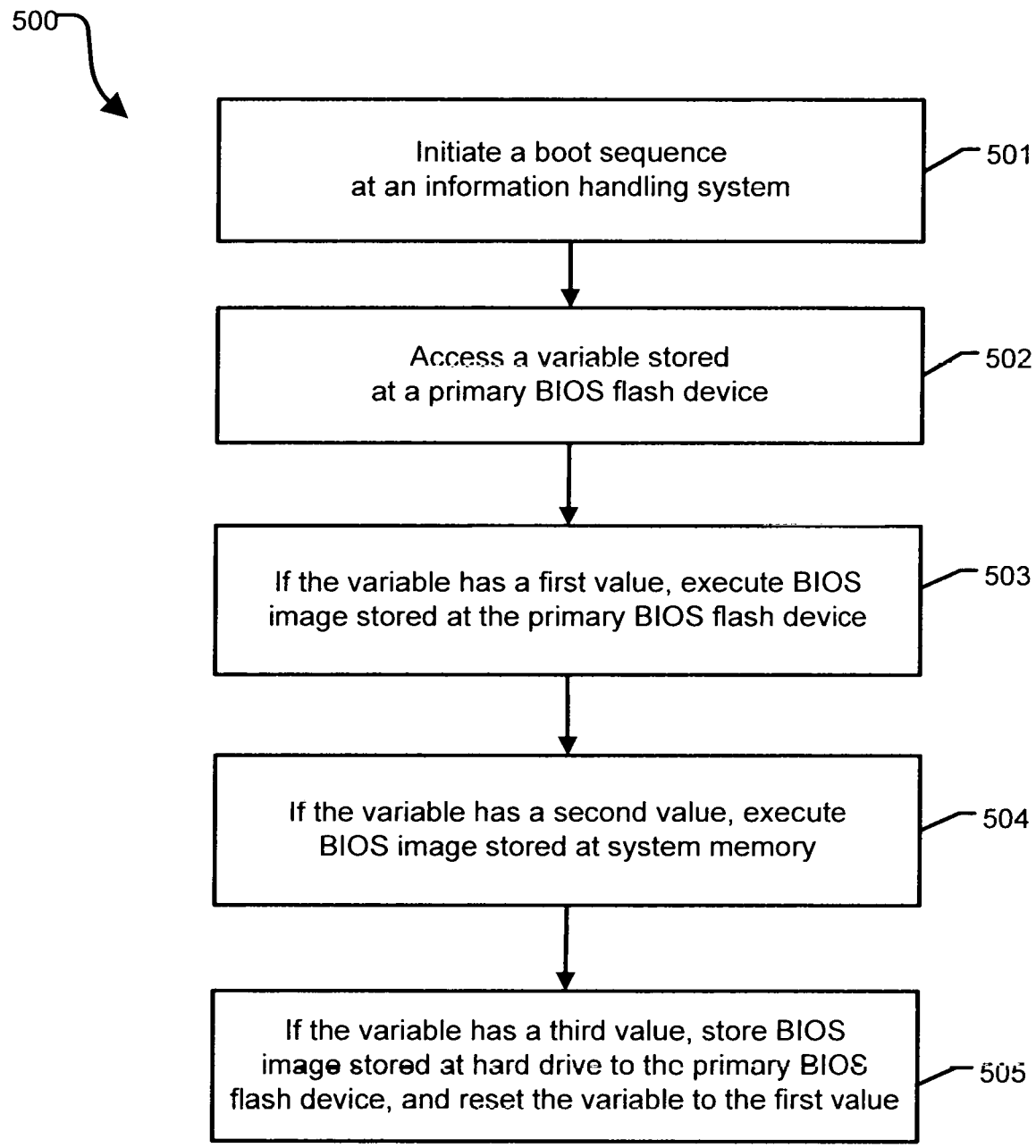
FIG. 5 is a flow diagram illustrating a method for configuring operations during a boot sequence based on a value of a boot mode variable, according to a specific embodiment of the present disclosure.

FIG. 5 shows a method 500 for configuring operations during a boot sequence based on a value of a boot mode variable, according to a specific embodiment of the present disclosure. Method 500 begins at block 501 where a boot sequence is initiated at an information handling system. At block 502, a boot mode variable stored at a primary BIOS flash device is accessed. For example, a particular value of a firmware environment variable stored at NVRAM 170 can be modified using an application programming interface provided by the UEFI architecture. The boot mode variable can be interrogated during execution of firmware instructions included at an initial boot block or other pre-initialization code, for example code associated with the pre-EFI (PEI) phase of a UEFI compliant boot sequence. In an embodiment, the boot mode variable can be configured to identify one of three alternative actions, herein referred to as normal, test, and commit. Block 503 corresponds to the boot mode variable having a first value (normal), indicating that the BIOS image currently stored at the primary BIOS flash device is to be executed. Block 504 corresponds to the boot mode variable having a second value (test), indicating that a BIOS image stored at system memory is to be executed. As disclosed herein, the BIOS image stored at system memory 104 can include a prospective update to the BIOS image presently stored at NVRAM 170 that is being evaluated. Block 505 corresponds to the boot mode variable having a third value (commit), indicating that a BIOS image stored at a hard drive is to be copied to the primary BIOS flash device. For example, having determined that the test of the updated BIOS image stored at system memory 104 was successful, a copy of the updated BIOS can be stored at a hard drive at system 100, and a value of the boot mode variable can be modified to indicated that the next boot of information handling system is to commit the updated BIOS image to NVRAM 170. Upon completion of the commit process, the value of the boot mode variable can be set to the first value to indicate that a subsequent boot event at system 100 is to utilize the now-updated BIOS stored at NVRAM 170.

Figure 6:
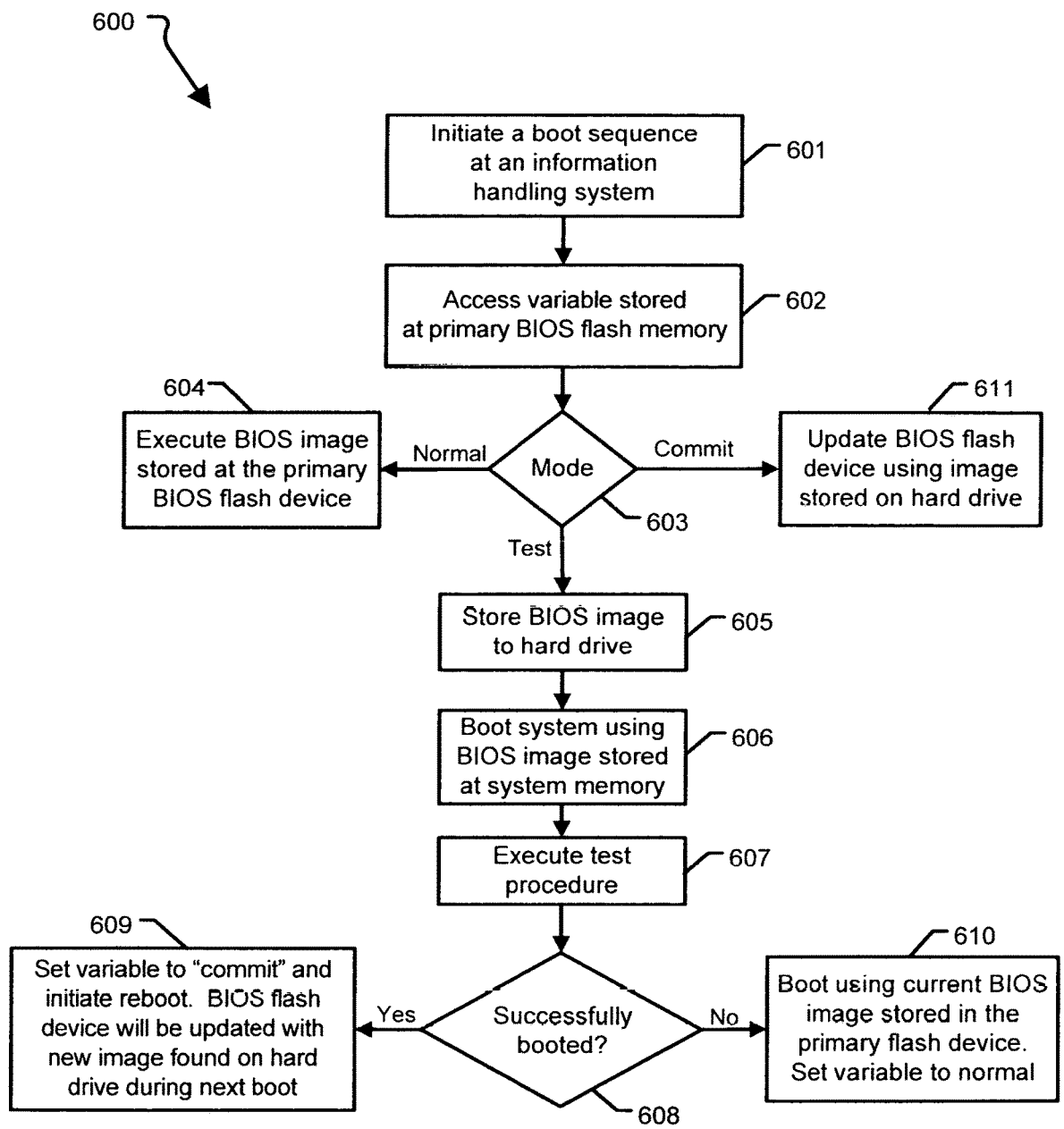
FIG. 6 is a flow diagram illustrating a method for configuring operations during a boot sequence according to a specific embodiment of the present disclosure.

FIG. 6 shows a method 600 for configuring operations during a boot sequence according to a specific embodiment of the present disclosure. Method 600 begins at block 601 where a boot sequence is initiated at an information handling system. At block 602, a boot mode variable stored at the primary BIOS flash device is accessed. If a value of the boot mode variable indicates that the boot sequence is a normal boot sequence, the method transitions from decision block 603 to block 604 where the BIOS image stored at the primary BIOS flash memory device is executed. If a value of the boot mode variable indicates that the boot sequence is a test boot sequence, the method transitions from decision block 603 to block 605 where steps are initiated to determine the viability of a prospective updated BIOS image. At block 605, the BIOS image is stored at a system hard drive. At block 606, the BIOS image under test is executed instead of the image stored at the primary BIOS flash memory device. The BIOS image under test has been previously stored at system memory, such as system memory 104, and is maintained there while the boot sequence is initiated.

At block 607, a test procedure optionally included at a payload of the BIOS update executable is executed. For example, the test procedure can be executed during a driver execution phase of a UEFI-compliant boot sequence, and an indication of the success or failure of the test procedure can be recorded. If the test procedure indicates that the BIOS image under evaluation appears to be operating correctly, method 600 transitions from decision block 608 to block 609 where the boot mode variable is set to indicate that the new BIOS image can be committed to the primary BIOS flash memory device during the next boot sequence. The new BIOS image will have previously been stored at a hard drive at information handling system 100. As described above, the decision to commit the new BIOS image can be further qualified based on authorization received from a user, or based on a result of additional validation protocols. If however the test procedure executed at block 607 indicates a problem with the new BIOS image, method 600 transitions from decision block 608 to block 610 where a reboot of the information handling system is initiated using the original BIOS image stored at the primary BIOS flash memory device. A record of the problem can be stored at a system log to facilitate further diagnosis. Returning to decision block 603, if a value of the boot mode variable corresponds to a commit operation, method 600 transitions to block 611 where the updated BIOS image, that is presently stored at the hard drive, is committed to the primary BIOS flash memory device.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving a basic input/output system (BIOS) update executable at an information handling system (IHS), the executable including a first payload containing a BIOS image;
storing the BIOS image at system memory included at the IHS; and
providing a boot mode variable stored at a primary BIOS flash memory device, the boot mode variable having states including:
 a first state identifying that the next boot at the IHS is to execute a BIOS image stored at the primary BIOS flash memory device;
 a second state identifying that the next boot of the IHS is to execute a BIOS image stored at system memory; and
 a third state identifying that a BIOS image stored at a hard drive should be stored at the primary BIOS flash memory device.

2. The method of claim 1, further comprising
executing the BIOS image stored at the system memory before storing the BIOS image at a primary BIOS flash memory device.

3. The method of claim 1, further comprising configuring the boot mode variable stored at a primary BIOS flash memory device to indicate that the next boot sequence at the IHS is to execute the BIOS image stored at the system memory instead of a BIOS image stored at the primary BIOS flash memory device.

4. The method of claim 1, further comprising:
determining that the first boot sequence is successful; and
storing the BIOS image at a primary BIOS flash memory device.

5. The method of claim 4, further comprising:
configuring the boot mode variable stored at the primary BIOS flash memory device to indicate that the next boot sequence at the IHS is to execute the BIOS image stored at the primary BIOS flash memory device.

6. The method of claim 4, further comprising:
invoking a runtime executable, the runtime executable to configure the boot mode variable stored at the primary BIOS flash memory device to indicate that the next boot sequence at the IHS is to execute the BIOS image stored at the primary BIOS flash memory device.

7. The method of claim 4, further comprising:
providing a prompt to a user of the IHS, the prompt requesting permission to store the BIOS image at the primary BIOS flash memory device.

8. The method of claim 1, further comprising:
executing a test procedure during the first boot sequence, the test procedure stored at a second payload included at the BIOS update executable;
enabling storage of the BIOS image at a primary BIOS flash memory device in response to determining that a result of the execution of the test procedure is positive; and
disabling storage of the BIOS image at the primary BIOS flash memory device in response to determining that a result of the execution of the test procedure is negative.

9. The method of claim 1, further comprising configuring the boot mode variable stored at a BIOS flash memory device to indicate that the next boot sequence at the IHS is to execute the BIOS image stored at the system memory instead of a BIOS image stored at the BIOS flash memory device.

10. A method comprising:
receiving a basic input/output system (BIOS) update executable at an information handling system (IHS), the executable including a first payload containing a BIOS image;
booting the IHS by executing the BIOS image before storing the BIOS image at a primary BIOS flash memory device;
storing the BIOS image at a primary BIOS flash memory device in response to determining that the IHS booted successfully; and
preventing storage of the BIOS image at the primary BIOS flash memory device in response to determining that the IHS failed to boot successfully,
wherein executing the BIOS image further comprises:
 executing a test procedure during the first boot sequence, the test procedure stored at a second payload included at the BIOS update executable;
 enabling storage of the BIOS image at a primary BIOS flash memory device in response to determining that a result of the execution of the test procedure is positive; and
 disabling storage of the BIOS image at the primary BIOS flash memory device in response to determining that a result of the execution of the test procedure is negative.

11. The method of claim 10, further comprising:
providing a boot mode variable stored at the primary BIOS flash memory device, the boot mode variable having three states, the three states including:
 a first state identifying that the next boot at the IHS is to execute a BIOS image stored at the primary BIOS flash memory device;
 a second state identifying that the next boot of the IHS is to execute a BIOS image stored at system memory; and
 a third state identifying that a BIOS image stored at a hard drive should be stored at the primary BIOS flash memory device.

12. The method of claim 11, wherein executing the BIOS image before storing the BIOS image at a primary BIOS flash memory device comprises executing the BIOS image stored at a system memory at the IHS.

13. An information handling system comprising:
system memory;
a BIOS flash memory device; and
a processor, the processor operable to execute instructions to:
 receive a basic input/output system (BIOS) update executable at the information handling system (IHS), the executable including a first payload containing a BIOS image;
 store the BIOS image at the system memory; and
 store a boot mode variable having states including:
  a first state identifying that the next boot at the IHS is to execute a BIOS image stored at the BIOS flash memory device;
  a second state identifying that the next boot of the IHS is to execute a BIOS image stored at the system memory; and
  a third state identifying that a BIOS image stored at a hard drive should be stored at the BIOS flash memory device.

14. The information handling system of claim 13, further comprising configuring the boot mode variable stored at the BIOS flash memory device to indicate that the next boot sequence at the IHS is to execute the BIOS image stored at the system memory instead of a BIOS image stored at the BIOS flash memory device.

15. The information handling system of claim 13, the processor further operable to execute instructions to:
   determine that the first boot sequence is successful; and
   store the BIOS image at the BIOS flash memory device.

16. The information handling system of claim 13, the processor further operable to execute instructions to:
   execute a test procedure during the first boot sequence, the test procedure stored at a second payload included at the BIOS update executable;
   enable storage of the BIOS image at the BIOS flash memory device in response to determining that a result of the execution of the test procedure is positive; and
   disable storage of the BIOS image at the BIOS flash memory device in response to determining that a result of the execution of the test procedure is negative.

17. The information handling system of claim 13, the processor further operable to execute instructions to:
   execute the BIOS image before storing the BIOS image at a BIOS flash memory device.

\* \* \* \* \*